(12) United States Patent
Smith et al.

(10) Patent No.: US 8,768,561 B2
(45) Date of Patent: Jul. 1, 2014

(54) NOTIFICATION SYSTEM FOR ELECTRICALLY CHARGED VEHICLE

(75) Inventors: Daniel Todd Smith, Ann Arbor, MI (US); Nicholas Scott Sitarski, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 136 days.

(21) Appl. No.: 13/302,580

(22) Filed: Nov. 22, 2011

(65) Prior Publication Data

US 2013/0131911 A1 May 23, 2013

(51) Int. Cl.
*G01M 17/00* (2006.01)
(52) U.S. Cl.
USPC .......................................... 701/29.1
(58) Field of Classification Search
USPC .......................................... 701/29.1
See application file for complete search history.

(56) References Cited

U.S. PATENT DOCUMENTS

| | | | |
|---|---|---|---|
| 3,844,130 A * | 10/1974 | Wahnish | 62/133 |
| 5,275,012 A | 1/1994 | Dage et al. | |
| 5,524,446 A | 6/1996 | Hotta et al. | |
| 6,483,272 B1 * | 11/2002 | Terada et al. | 320/103 |
| 7,441,414 B2 | 10/2008 | Ziehr et al. | |
| 7,642,901 B2 * | 1/2010 | Kato et al. | 340/438 |
| 7,797,958 B2 | 9/2010 | Alston et al. | |
| 2004/0206102 A1 * | 10/2004 | Homan et al. | 62/228.1 |
| 2008/0309762 A1 * | 12/2008 | Howard et al. | 348/148 |
| 2009/0139781 A1 | 6/2009 | Straubel | |

FOREIGN PATENT DOCUMENTS

| WO | WO-2007/078270 A2 | 7/2007 |
|---|---|---|
| WO | WO-2010/131262 A2 | 11/2010 |

* cited by examiner

*Primary Examiner* — Behrang Badii
*Assistant Examiner* — Daniel L Greene
(74) *Attorney, Agent, or Firm* — Gifford, Krass, Sprinkle, Anderson & Citkowski, P.C.

(57) ABSTRACT

A notification system for an electrically charged vehicle having a charging system and a climate control system comprising a vehicle charging system, a display screen in communication with the vehicle charging system wherein the display screen is operable to provide a status update of the vehicle charging system wherein the status update provides information to the user regarding charging and/or pre-climate conditions. The status update is operable to provide a predetermined message to the user on the display screen regarding charging and/or pre-climate conditions within the electrically charged vehicle.

14 Claims, 3 Drawing Sheets

NOTIFICATION SYSTEM FOR ELECTRICALLY CHARGED VEHICLE

FIELD OF THE INVENTION

This invention relates generally to vehicle notification systems. More particularly, this invention relates to vehicle notification systems for electrically charged vehicles.

BACKGROUND OF THE INVENTION

Currently known electric vehicles display the state of charge and predicted range of vehicle upon a vehicle door opening. Although this information is useful, the information is not complete and does not provide enough information to properly inform the vehicle driver of the overall status of the vehicle. Previously known notification systems do not provide the user with an update of the pre-climate status before the user operates a vehicle or upon opening a vehicle door.

Pre-climate within an electrical vehicle is defined as the preheating or precooling of an electric vehicle before user operation of the vehicle. The pre-climate adjustment within an electric vehicle improves battery performance and prevents unnecessary drainage of the vehicle battery. The vehicle HVAC system requires a significant amount of battery power to be used to either heat or cool the vehicle. Pre-climate adjustment allows the user to bring the vehicle to a predetermined temperature before operation of the vehicle. The pre-climate adjustment may be scheduled prior to operation by the user. The pre-climate adjustment allows the vehicle interior to reach a predetermined temperature while the vehicle is still charging so as to not drain the electric vehicle battery prior to operation. The goal of the pre-climate adjustment is to allow the user of the electrically charged vehicle to start their drive within the electrically charged vehicle at their predetermined temperature without draining the battery of the vehicle.

Although the pre-climate adjustment is known in the art, the art severely lacks notification systems to the driver about the pre-climate and charging status. Accordingly, it is desirable to provide a notification system for an electrically charged vehicle having a charging and climate control system. Furthermore, it is desirable to provide a notification system to the operator of an electrically charged vehicle wherein the notification system is activated upon door opening or powering on of the vehicle.

SUMMARY OF THE INVENTION

The present invention provides a notification system for an electrically charged vehicle having a charging system and a climate control system. The vehicle provides for pre-climate adjustment before the vehicle user operates the vehicle. The notification system comprises a vehicle charging system, a display screen in communication with the vehicle charging system wherein the display screen is operable to provide a status update of the vehicle charging system wherein the status update provides information to the user regarding charging and/or pre-climate conditions. The status update is operable to provide a predetermined message to the user on the display screen regarding charging and/or pre-climate conditions within the electrically charged vehicle. A display screen of the electrically charged vehicle displays information regarding the status of pre-climate conditions including the time before the pre-climate predetermined conditions are met. The status update is also operable to provide specific temperature information to the user of the electrically charged vehicle. The status is also operable to provide the estimated time until completion of the pre-climate settings. The predetermined message displayed on the screen of the electrically charged vehicle is also operable to provide the reason for interruption in pre-climate adjustment such as an open door, low battery level, or unplugging of the vehicle.

DETAILED DESCRIPTION OF THE DRAWINGS

Figures 1, 2A:
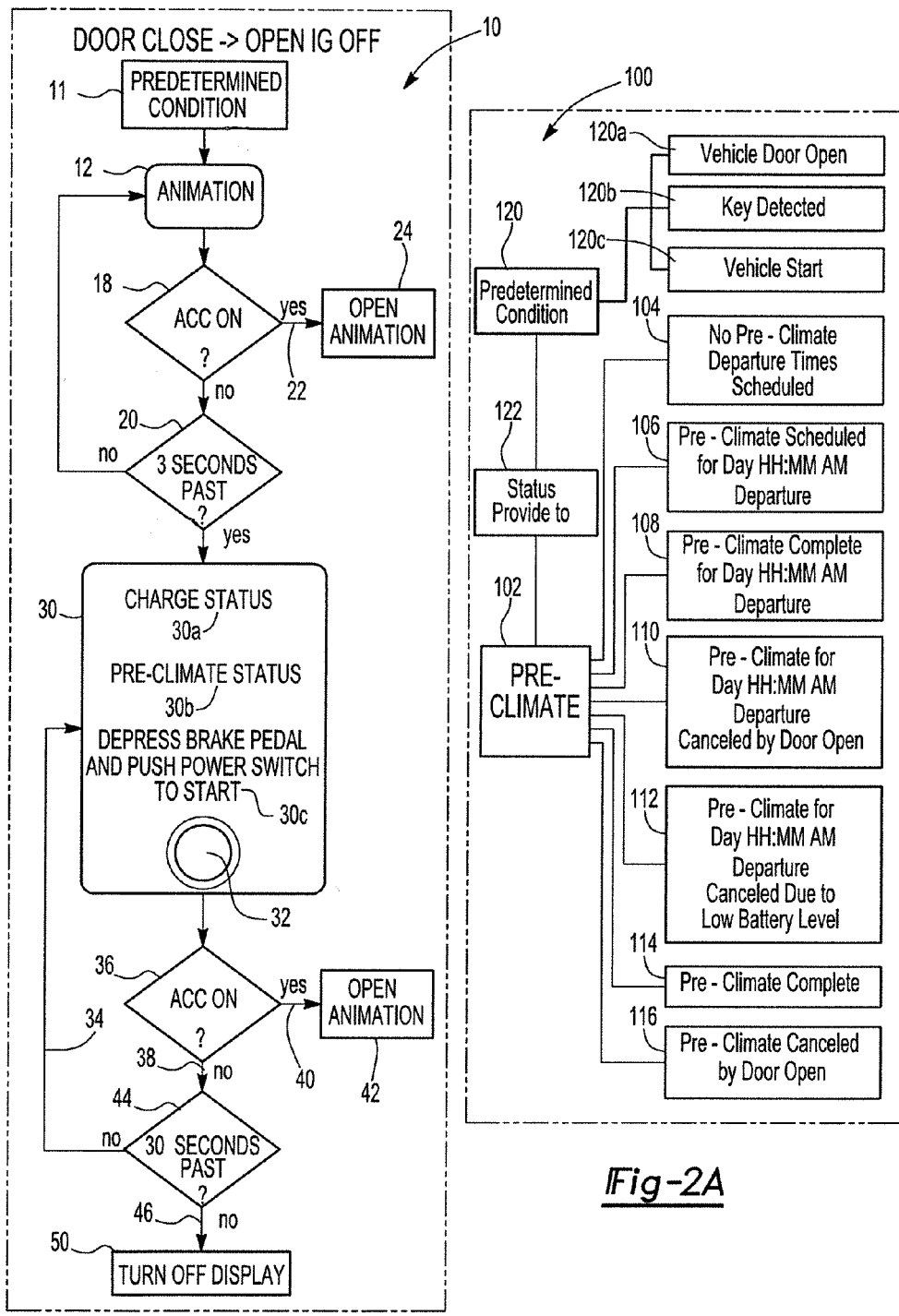
FIG. 1 illustrates a flowchart of the steps required to provide an update to the user of an electrically charged vehicle.
FIG. 2A illustrates the various pre-climate status updates displayed to the user of the electrically charged vehicle.

The object of the present invention is to provide vehicle information to the driver or user of an electrically charged vehicle upon the door of the vehicle being opened. Immediate feedback of the charge or charge schedule and pre-climate status is provided to the user upon opening of the vehicle door. Alternatively, a separate condition, such as the start of a vehicle, will trigger the activation of the alert of the pre-climate status or charge status to the user or driver. FIG. 1 illustrates a flowchart showing the process and activation of the status update provided to the user. The process 10 first includes detection of a predetermined condition 11. The predetermined condition 11 may be a plurality of factors including a vehicle door opening, a key detected, the vehicle starting, or other condition. If the predetermined condition is met, animation 12 is displayed on the display screen of a vehicle.

The animation 12 may be Welcome information, brand or logo display animation on the display screen, or other type of animation relevant to the operation of the vehicle. If the auto climate (ACC) 18 is on 22, then a second set of opening animation 24 is provided to the user. If the ACC 18 is not on, and after a delay of time 20, the first animation 12 is subsequently displayed. After the time delay 20, the status display 30 is provided to the user or driver of the vehicle. The status display 30 depicts the charge status 30a, the pre-climate status 30b, and optionally depicts instructions of how to start the vehicle 30c, 32. In the embodiment as shown in FIG. 1, instructions are provided to the user of how to operate the vehicle. The status display 30 depicts the language "depress brake pedal and push power switch to start" 30c. The status display 30 further depicts a graphical start button 32 to better allow the user to locate the start button 32.

Figure 2B:
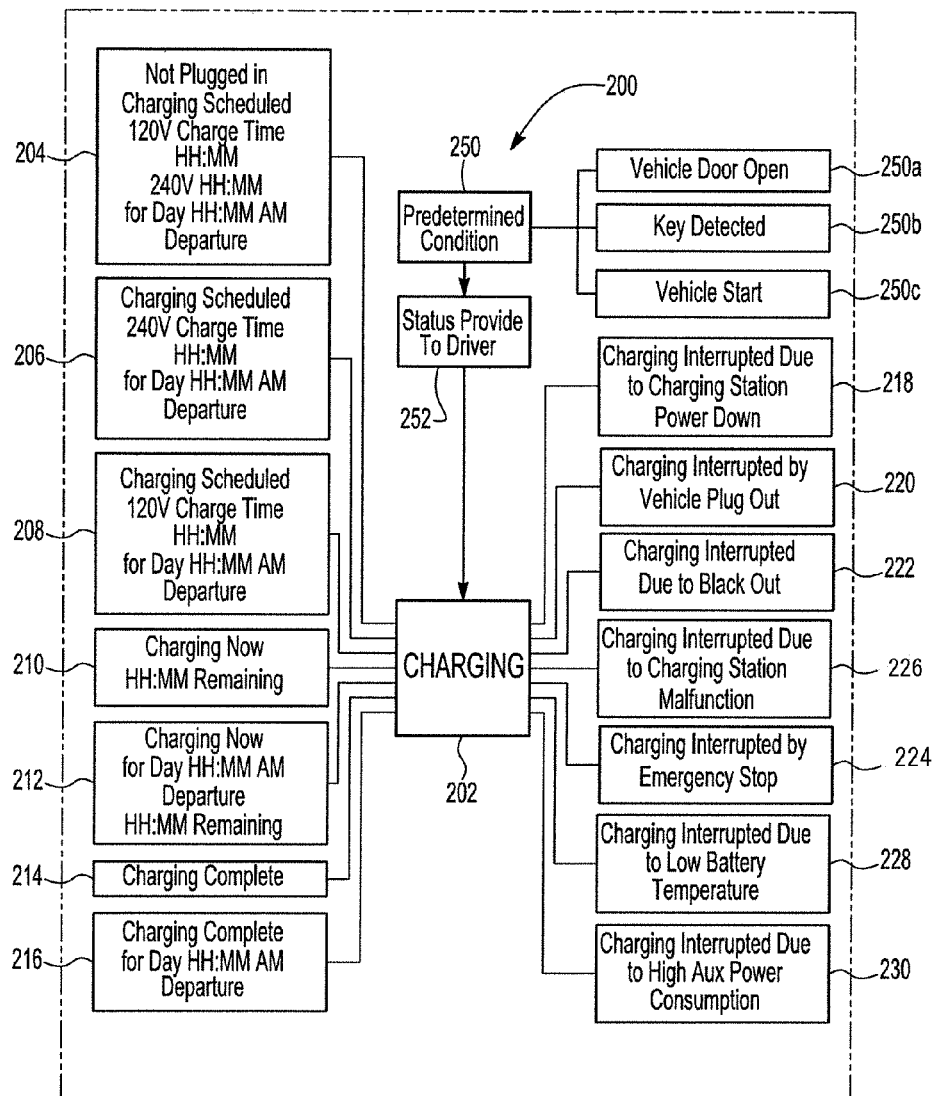
FIG. 2B illustrates the various charging status updates provided to the user of an electrically charged vehicle.

The various displays as shown on the status display 30 of the charge status 30a and the pre-climate status 30b are further discussed in FIG. 2A and FIG. 2B.

The status display 30 is reshown to the driver depending on whether or not the pre-climate adjustment 36, ACC on 36, is either on 40 or off 38. If the ACC is on 40, a third opening animation 42 is displayed to the user. If the ACC is off 38, a time delay 44 is provided and the display status 30 is rerun 34 or the display is turned off 50 if the delay is not met 46.

FIG. 2 illustrates the various pre-climate status displays as displayed on the status display 30 as shown in FIG. 1. The flowchart 100 illustrates the requirement of a predetermined condition 120 to display a status 122 to the user. The predetermined condition 120 can be, among other things, the vehicle door opening 120a, a key detected 120b, or a vehicle start 120*c*. Other triggers or predetermined conditions not specifically enumerated can also activate display of the status display 30.

If the predetermined condition 120 is satisfied, a status 122 is provided to the driver. FIG. 2A illustrates the various pre-climate adjustment status updates as displayed in the status display 30. The pre-climate 120 statuses display various statuses of the pre-climate such as if the pre-climate adjustment is turned on, if the pre-climate adjustment is scheduled, if the pre-climate adjustment is complete, or if the pre-climate has been interrupted by an external source such as the battery temperature being too low or the vehicle being unplugged.

The statuses of the pre-climate 120 may also specifically enumerate the time before completion of the pre-climate adjustment. The pre-climate 120 status may also display whether or not the pre-climate adjustment is complete or has been canceled. As enumerated in FIG. 2A, the various pre-climate 102 status updates as displayed in the status display 30 include the following statuses: "no pre-climate departure times scheduled" 104, "pre-climate scheduled for HH:MM AM departure" 106, "pre-climate complete 114 for day HH:MM AM departure" 108, "pre-climate for day HH:MM AM departure canceled by door open" 110, "pre-climate for day HH:MM AM departure canceled due to low battery level" 112, "pre-climate complete" 114, and "pre-climate canceled by door open" 116.

Various other status updates of the pre-climate 102 may also be displayed on the status display 30 as required by the pre-climate 102 adjustment. FIG. 2 illustrates the various status updates of the charging 202 to be displayed on the status display 30 as shown in FIG. 1.

The flowchart 200 shows the requisite predetermined condition 250 required to be met before a status 252 is to be displayed on the status display 30. The predetermined condition 250 may be, among other conditions, the vehicle door opening 250*a*, the vehicle key detected within or near the vehicle 250*b*, or the vehicle start 250*c*. If the predetermined condition 250 is met, the status 252 is delivered to the driver. FIG. 2B illustrates the various charging 202 status updates to be provided to the driver on the status display 30. The various charging status updates are provided to the user to provide the most current information regarding the status of the charging 202 process of the electric method in accordance with the present invention for displaying information to the user of an automotive vehicle regarding pre-climate adjustment, the method preformed by a controller, settings and current status.

Figure 3:
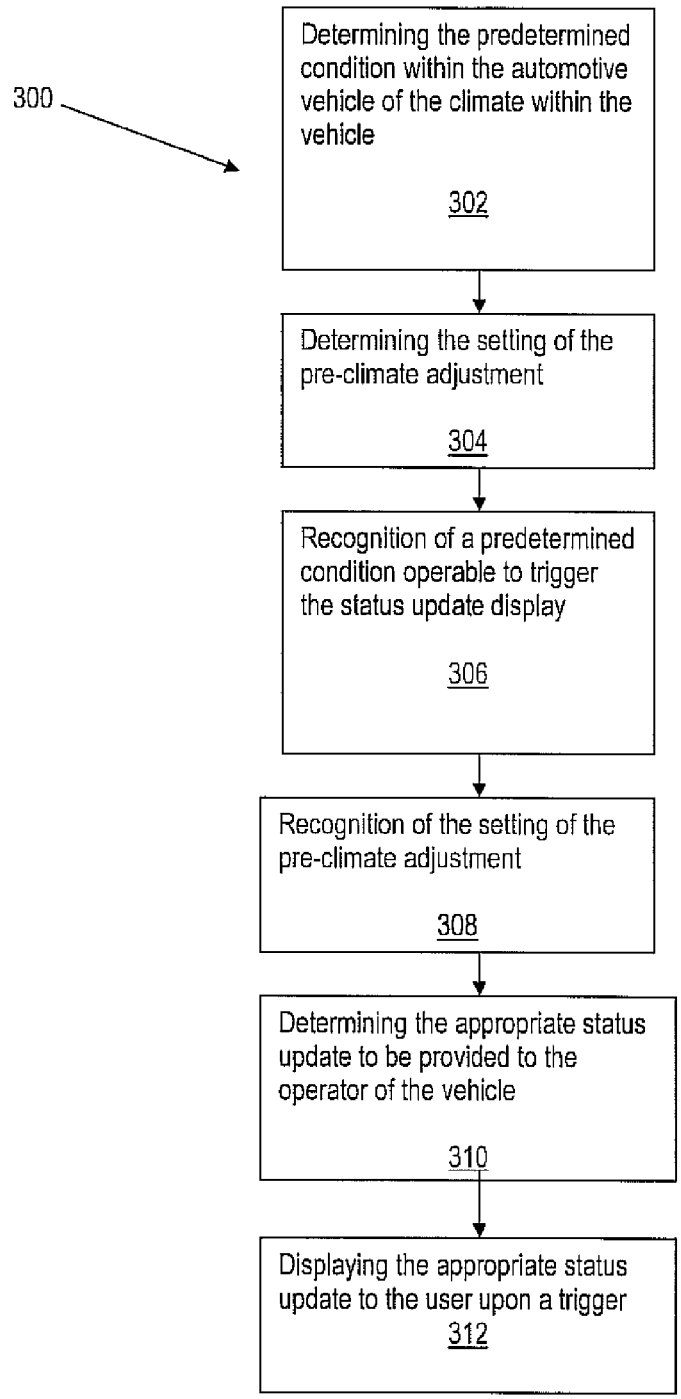
FIG. 3 illustrates the method in accordance with the present invention.

Further, a controller 31 is provided to control the method and step provided by the system. The controller 31 controls the method 300 in accordance with the present invention. FIG. 3 shows the method 300 comprises the steps of determining 302 the predetermined condition within the automotive vehicle of the climate within the vehicle, determining 304 the setting of the pre-climate adjustment, recognition 306 of a predetermined condition operable to trigger the status update display, recognition 308 of the setting of the pre-climate adjustment, determining 310 the appropriate status update to be provided to the operator of the vehicle and displaying 312 the appropriate status update to the user upon a trigger 121 (as shown in FIG. 2A). In the present embodiment, the trigger is a door opening, recognition by the controller of a key within or in close proximity to the vehicle or recognition of the user turning on the vehicle.

The various status updates regarding charging 202 are enumerated as follows: "not plugged in charging scheduled 120V charge time HH:MM 240V HH:MM for day HH:MM AM departure" 204, "charging scheduled 240V charge time HH:MM for day HH:MM AM departure" 206, "charging scheduled 120V charge time HH:MM for day HH:MM AM departure" 208, "charging now HH:MM remaining" 210, "charging now for day HH:MM AM departure HH:MM remaining" 212, "charging complete" 214, "charging complete for day HH:MM AM departure" 216, "charging interrupted due to charging station power down" 218, "charging interrupted by vehicle plug out" 220, "charging interrupted due to blackout" 222, "charging interrupted by emergency stop" 224, "charging interrupted due to charging station malfunction" 226, "charging interrupted due to low battery temperature" 228, and "charging interrupted due to high aux power consumption" 230.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

The invention claimed is:

1. A notification system for an electrically charged vehicle having a charging system and a climate control system, the electrically charged vehicle providing for pre-climate adjustment before user operation, the notification system comprising:
   a vehicle charging system;
   a controller to determine a predetermined condition within the vehicle, the predetermined condition being opening of the vehicle door prior to ignition of the vehicle while the vehicle is charging;
   a display screen within the vehicle in communication with the vehicle charging system and the controller, the controller displaying on the display screen within the vehicle a status update regarding charging or pre-climate conditions automatically upon the predetermined condition including opening of a vehicle door.

2. The notification system for the electrically charged vehicle of claim 1 wherein the notification system further includes a trigger operator activated upon recognition of the predetermined condition.

3. The notification system for the electrically charged vehicle of claim 1 wherein a predetermined message displayed on the display screen of the electrically charged vehicle displays information regarding the status charging of the electrically charged vehicle.

4. The notification system for the electrically charged vehicle of claim 3 wherein the predetermined message displayed on the display screen of the electrically charged vehicle displays reason for interruption in charging (unplugged, black out, emergency stop, low battery temperature . . . etc.).

5. The notification system for the electrically charged vehicle of claim 1 wherein a predetermined message displayed on the display screen of the electrically charged vehicle displays information regarding the status of pre-climate conditions.

6. The notification system for the electrically charged vehicle of claim 5 wherein the predetermined message displayed on the display screen of the electrically charged vehicle provides specific temperature information to the vehicle user.

7. The notification system for the electrically charged vehicle of claim 5 wherein a predetermined message displayed on the display screen of the electrically charged vehicle provides information regarding estimated time of completion of pre-climate settings.

8. The notification system for the electrically charged vehicle of claim 7 wherein a predetermined message displayed on the display screen of the electrically charged vehicle provides information regarding stopping of pre-climate adjustment.

9. The notification system for the electrically charged vehicle of claim 8 wherein a predetermined message displayed on the display screen of the electrically charged vehicle displays reason for interruption in pre-climate adjustment such as open door.

10. The notification system for the electrically charged vehicle of claim 8 wherein the predetermined message displayed on the display screen of the electrically charged vehicle displays estimated time before completion of charging.

11. The notification system for the electrically charged vehicle of claim 8 wherein the predetermined message displayed on the display screen of the electrically charged vehicle displays any interruption in charging.

12. A method in accordance with the present invention for displaying information to the user of an automotive vehicle regarding pre-climate adjustment, the method performed by a controller, settings and current status, the method comprising the steps of:
    determining by the controller prior to ignition of the automotive vehicle and during charging of the automotive vehicle a predetermined condition within the automotive vehicle of the climate within the automotive vehicle, the predetermined condition being opening of an automotive vehicle door;
    determining the setting of the pre-climate adjustment;
    recognition of the predetermined condition operable to trigger a status update display;
    recognition of the setting of the pre-climate adjustment;
    determining an appropriate status update to be provided to the user of the automotive vehicle; and
    displaying the appropriate status update prior to ignition of the automotive vehicle on the display screen within the automotive vehicle, the appropriate status update displayed automatically to the user upon opening of the automotive vehicle door.

13. A method in accordance with the present invention for displaying information to the user of an automotive vehicle regarding pre-climate adjustment, the method performed by the controller, settings and current status, the method comprising the steps of:
    determining by the controller prior to ignition of the automotive vehicle and during charging of the vehicle a predetermined condition within the automotive vehicle of the climate within the vehicle, the predetermined condition being recognition of the key within close proximity to the automotive vehicle;
    determining the setting of the pre-climate adjustment;
    recognition of the predetermined condition operable to trigger a status update display;
    recognition of the setting of the pre-climate adjustment;
    determining an appropriate status update to be provided to a user of the automotive vehicle; and
    displaying the appropriate status update on a display screen prior to ignition within the automotive vehicle, the appropriate status update displayed automatically to the user upon opening of the automotive vehicle door or recognition of the key within close proximity to the automotive vehicle.

14. A notification system for an electrically charged vehicle having a charging system and a climate control system, the electrically charged vehicle providing for pre-climate adjustment before vehicle user operation, the notification system comprising:
    a vehicle charging system;
    a controller to determine a predetermined condition within the vehicle prior to ignition of the vehicle while the vehicle is charging;
    a display screen within the vehicle in communication with the vehicle charging system and the controller, the controller displaying on the display screen within the vehicle a status update regarding charging or pre-climate conditions automatically upon the predetermined condition recognition of a key in close proximity to but not within the vehicle.

* * * * *